Dec. 15, 1959   F. N. SPIESS   2,917,300
FREQUENCY MODULATING ACCELEROMETER

Filed Dec. 7, 1956   3 Sheets-Sheet 1

F. N. SPIESS   INVENTOR.

Dec. 15, 1959 F. N. SPIESS 2,917,300
FREQUENCY MODULATING ACCELEROMETER
Filed Dec. 7, 1956 3 Sheets-Sheet 2

F. N. SPIESS  INVENTOR.

F. N. SPIESS  INVENTOR.

United States Patent Office 2,917,300
Patented Dec. 15, 1959

2,917,300

FREQUENCY MODULATING ACCELEROMETER

Fred N. Spiess, La Jolla, Calif., assignor to The Regents of the University of California, a corporation of California Application December 7, 1956, Serial No. 627,044

2 Claims. (Cl. 264—1)

This invention relates to the accurate measurement of acceleration or gravitational force, in particular to an instrument for measuring the average value of such acceleration or gravitational force over any desired time interval.

In the past the determination of the average value of gravitational force has been made using sets of pendulums or masses supported by spring suspensions. In the latter case the generation of an electrical signal to be averaged has been accomplished, if at all, by use of photocell systems to determine the position of the mass. Some system for bringing the spring to a null point is then used and the electrical signal derived from this system. The present invention provides that the deflection produces, directly, a type of signal appropriate for linear averaging over any selected time interval from a tenth of a second to many minutes with great ease in changing from one integration time to another.

The object of this invention is to provide a simple, sensitive, accelerometer having an electrical output which is directly proportional to the deflection and is both quite stable and convenient to average over any desired period of time.

The device consists of a leaf spring which carries three plates, each forming one side of an air condenser, the other plate of each condenser being fixed to the base of the instrument. The three condensers are part of the phase shift network of a phase shift oscillator, thus making the frequency of oscillation directly proportional to the gap and thus to the force on the weight at the end of the leaf. Average values can then be obtained by counting cycles of the oscillator output signal over any desired time interval.

Figure 1:
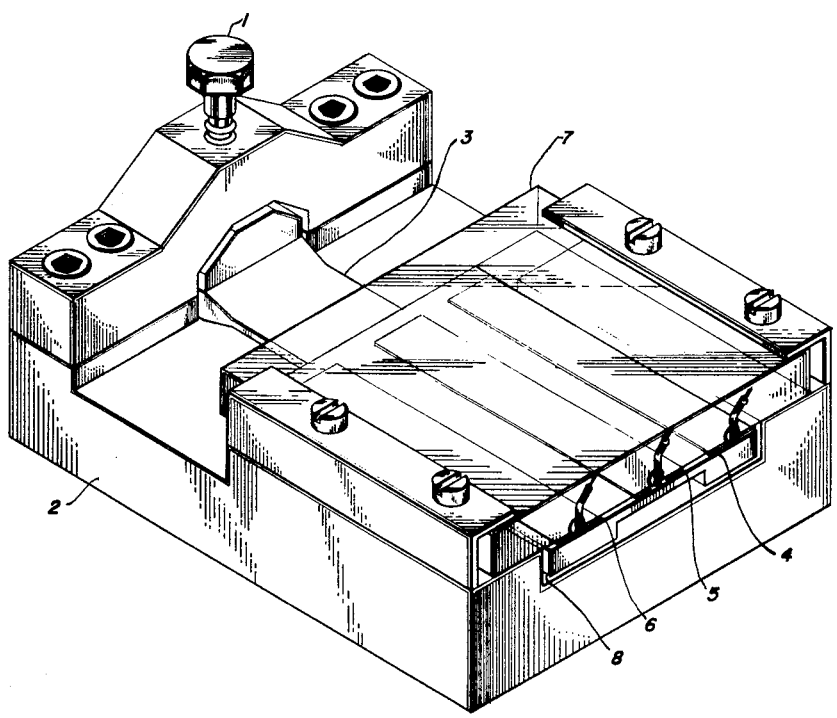
Figure 2A:
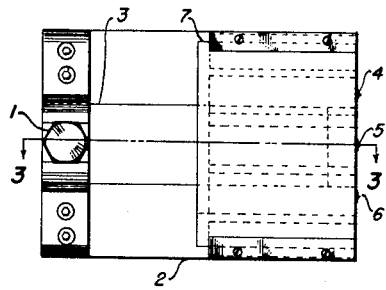
Figure 2B:
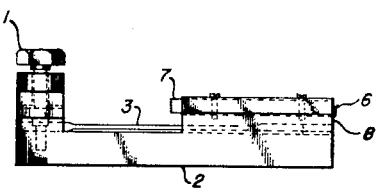
Figure 3:
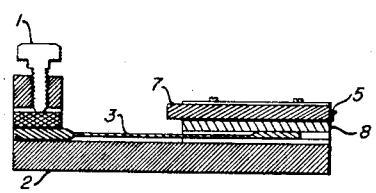
Figure 4:
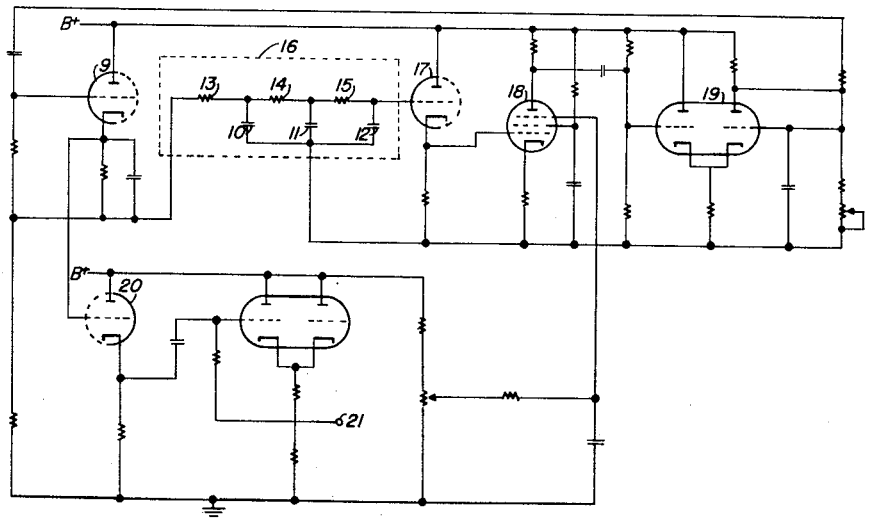
Figure 5:
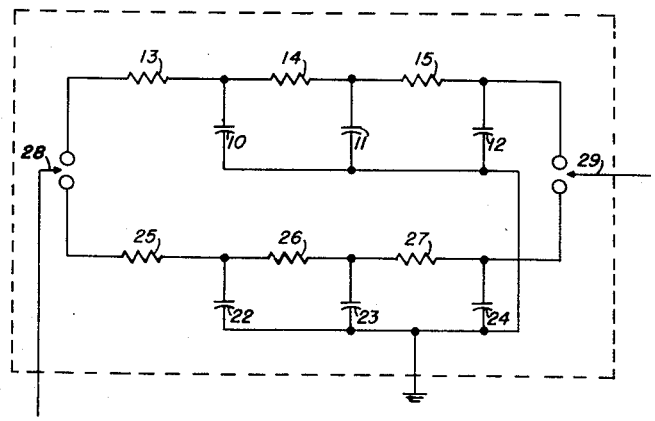

Figure 1 shows the leaf spring and air condensers pictorially while Figures 2a, 2b and 3 show them in plan, elevation and section. Figure 4 shows the electric circuit of the oscillator. Figure 5 shows an alternative arrangement for the phase shift network.

The mechanical portion of the system is composed of the base 2 to which a metal leaf spring 3 is clamped at 1. The spring supports a metal plate 8 on its free end. The plate serves both as deflecting mass and as the common movable grounded plate of the three air condensers. The base 2 also supports a glass plate 7 which has on its underside three parallel, identical strips of metal 4, 5, 6 isolated electrically from the base. These strips form the upper, fixed plates of the three air condensers. The dimensions of the base 2 are such that the gap between the upper surface of the mass 8 and the lower surfaces of the metal strips 4, 5, 6 on the glass plate 7 is about 1 or 2 thousandths of an inch. The total deflection of the mass, due to the gravitational force, is about ten times as great, thus the most extreme acceleration variation which can be considered is about one-tenth of the acceleration due to gravity. On the other hand, if the gap is measured electrically with an accuracy of one part in 100,000 this is sufficient to give accuracy of one part in a million for the gravitational force.

The three air condensers 10, 11, 12 are connected to three resistors 13, 14, 15 to form a phase shift network 16. The output of this network is connected to a high input impedance cathode follower circuit 17 and then passes to an amplifier 18 having about 40 db of gain available. The signal level is controlled by the gain control circuit 19 and then fed through a cathode follower having very low output impedance 9 back into the input end of the phase shift network 16.

From this same cathode follower circuit the signal also goes to the output amplifier 20. Any appropriate frequency counter can then be connected to the terminal 21.

If the three resistances 13, 14, 15 are equal to R and the three capacitances 10, 11, 12 are equal to C then the frequency of this oscillator is:

$$f = \frac{\sqrt{6}}{2\pi RC}$$

A linear output results since C is inversely proportional to the gap between the condenser plates which in turn is proportional to the deflection of the spring. The number of cycles of oscillation in any given time, divided by the time, will then be directly proportional to the mean displacement of the spring during that time interval. The accelerometer is thus useful in determining the value of gravitational force in case the instrument is mounted on a moving platform as is the case in making gravity measurements at sea.

An alternative embodiment uses the same mechanical and electrical system, but provides a second phase shift network utilizing fixed condensers 22, 23, 24 and resistors 25, 26, 27 having values approximately those of the first network 16. Both phase shift networks are housed in a thermostated case and switches 28, 29 are provided to allow use of either one as the frequency controlling element in the oscillator. Measurement of the frequency using the fixed network then serves to calibrate the electronic portion of the system and the subsequent measurement using the spring mounted condensers then becomes equivalent to a comparison of the two sets of condensers. The result is a system having very good long term stability even if it is necessary to change vacuum tubes or other components in the oscillator.

What is claimed is:

1. A frequency modulating accelerometer comprising a plurality of fixed plates; a movable plate common to and spaced equally from said fixed plates to define a plurality of air condensers, said movable plate being responsive to the forces of gravity and accelerations acting thereon to move to different positions, thereby varying the capacitances of said air condensers equally in response to changes in position of said movable plate; an oscillator having a first electron tube and a second electron tube; and a resistance capacitance tuning circuit connected between said first tube and said second tube and including said movable plate and said fixed plates whereby the frequency of oscillation of said oscillator is directly proportional to said forces of gravity and accelerations.

2. A frequency modulating accelerometer comprising a plurality of fixed plates; a movable plate common to and spaced equally from said fixed plates to define a plurality of air condensers, said movable plate being responsive to the forces of gravity and accelerations acting thereon to move to different positions, thereby varying the capacitances of said air condensers equally in response to changes in position of said movable plate; an amplifier having an input and an output; resistance means connected to said plurality of air condensers to form a phase-shift network, said phase-shift network being connected between said input and said output to cause said amplifier to oscillate at a frequency proportional to said forces of gravity and accelerations.

References Cited in the file of this patent

UNITED STATES PATENTS

| | | |
|---|---|---|
| 2,322,681 | Zenor | June 22, 1943 |
| 2,446,106 | Robertson | July 27, 1948 |
| 2,497,605 | Hepp | Feb. 14, 1950 |